United States Patent
Imhoff

(10) Patent No.: US 11,028,571 B2
(45) Date of Patent: Jun. 8, 2021

(54) AERATED CONCRETE-HYBRID CONSTRUCTION ELEMENT

(71) Applicant: CBS International GmbH, Deißlingen (DE)

(72) Inventor: Adolf Imhoff, Iserlohn (DE)

(73) Assignee: CBS INTERNATIONAL GMBH, Deißlingen (DE)

( * ) Notice: Subject to any disclaimer, the term of this patent is extended or adjusted under 35 U.S.C. 154(b) by 0 days.

(21) Appl. No.: 16/489,291

(22) PCT Filed: Feb. 27, 2018

(86) PCT No.: PCT/EP2018/054732
§ 371 (c)(1),
(2) Date: Aug. 27, 2019

(87) PCT Pub. No.: WO2018/158211
PCT Pub. Date: Sep. 7, 2018

(65) Prior Publication Data
US 2020/0063428 A1 Feb. 27, 2020

(30) Foreign Application Priority Data
Feb. 28, 2017 (DE) .......................... 202017101111.9

(51) Int. Cl.
*E04B 1/14* (2006.01)
*E04B 5/48* (2006.01)
(Continued)

(52) U.S. Cl.
CPC .................. *E04B 1/14* (2013.01); *E04B 5/48* (2013.01); *B32B 2419/00* (2013.01);
(Continued)

(58) Field of Classification Search
CPC ... B32B 2419/00; B32B 2607/00; E04B 1/14; E04B 5/04; E04B 5/48; E04C 2/044;
(Continued)

(56) References Cited

U.S. PATENT DOCUMENTS

| 758,728 A | * | 5/1904 | Wight et al. | .............. E04B 5/40 |
| | | | | 52/250 |
| 1,813,909 A | * | 7/1931 | Brainard | ................. E04C 2/384 |
| | | | | 52/601 |

(Continued)

FOREIGN PATENT DOCUMENTS

| CL | 201401766 | 6/2014 |
| DE | 3522382 A1 | 1/1987 |

(Continued)

OTHER PUBLICATIONS

DE 19743413 Machine Translation (Year: 2020).*

(Continued)

*Primary Examiner* — James M Ference
(74) *Attorney, Agent, or Firm* — Polson Intellectual Property Law, PC; Margaret Polson; Christopher Sylvain

(57) ABSTRACT

An aerated concrete-hybrid construction element comprises a plurality of support structure profiles integrated therein and arranged parallel to one another at a distance from one another. The support structure profiles have a rib running transversely to the plane of the construction element, each with a respective support structure limb angled in the same direction away from the plane of the rib and running parallel or approximately parallel to the adjacent outer surface of the construction element. The support structure limbs of the support structure profiles are cast into an aerated-concrete layer extending over the length of the support structure limbs in their juxtaposed arrangement.

12 Claims, 6 Drawing Sheets

(51) Int. Cl.
*E04C 2/04* (2006.01)
*E04F 11/02* (2006.01)

(52) U.S. Cl.
CPC .......... *B32B 2607/00* (2013.01); *E04C 2/044* (2013.01); *E04C 2/049* (2013.01); *E04F 11/02* (2013.01); *E04F 2011/0212* (2013.01)

(58) Field of Classification Search
CPC .... E04C 2/049; E04C 2/06; E04C 5/06; E04F 11/02; E04F 2011/0212
See application file for complete search history.

(56) References Cited

U.S. PATENT DOCUMENTS

| | | | | |
|---|---|---|---|---|
| 2,150,586 A * | 3/1939 | McAver | ............... | E04F 11/022 52/182 |
| 2,772,560 A * | 12/1956 | Neptune | ............... | E04C 5/167 52/707 |
| 3,347,007 A * | 10/1967 | Hale | ............... | E04B 1/19 52/380 |
| 3,604,174 A * | 9/1971 | Nelson, Jr. | ............... | E04C 2/06 52/601 |
| 3,744,202 A * | 7/1973 | Hubmann | ............... | E04C 2/044 52/600 |
| 3,750,355 A * | 8/1973 | Blum | ............... | E04C 2/044 52/309.12 |
| 3,993,341 A * | 11/1976 | Bentley | ............... | E04B 1/215 294/89 |
| 4,040,221 A * | 8/1977 | Vermeulen-Amelot | | E04C 2/044 52/265 |
| 4,649,682 A * | 3/1987 | Barrett, Jr. | ............... | E04C 2/384 174/480 |
| 5,002,620 A * | 3/1991 | King | ............... | B28B 1/50 156/153 |
| 5,596,853 A * | 1/1997 | Blaney | ............... | E04C 2/044 52/223.7 |
| 5,758,463 A * | 6/1998 | Mancini, Jr. | ............... | E04C 2/384 52/309.12 |
| 5,797,238 A * | 8/1998 | Berntsson | ............... | B28B 1/008 264/228 |
| 6,185,890 B1 * | 2/2001 | Ritter | ............... | E04C 2/044 52/251 |
| 6,237,297 B1 * | 5/2001 | Paroly | ............... | E04C 2/06 52/309.4 |
| 6,701,683 B2 * | 3/2004 | Messenger | ............... | E04C 2/044 52/309.11 |
| 6,718,712 B1 * | 4/2004 | Heath | ............... | E04C 2/044 52/309.12 |
| 6,790,544 B2 * | 9/2004 | Schmitz | ............... | E01C 5/065 428/703 |
| 7,032,354 B2 * | 4/2006 | Hansort | ............... | B66C 1/66 294/82.1 |
| 7,790,302 B2 * | 9/2010 | Ladely (Guevara) | .. | E04C 2/044 428/703 |
| 2001/0010140 A1 * | 8/2001 | Ritter | ............... | E04C 2/06 52/649.1 |
| 2001/0015045 A1 * | 8/2001 | Paroly | ............... | E04C 2/06 52/652.1 |
| 2004/0065034 A1 * | 4/2004 | Messenger | ............... | E04C 2/06 52/309.11 |
| 2004/0068948 A1 * | 4/2004 | Wrass | ............... | E04B 1/942 52/309.7 |
| 2006/0201090 A1 * | 9/2006 | Guevara | ............... | C04B 16/08 52/309.12 |
| 2006/0251851 A1 * | 11/2006 | Bowman | ............... | B32B 3/06 428/71 |
| 2006/0265985 A1 * | 11/2006 | Nichols | ............... | E04C 2/384 52/309.8 |
| 2007/0028541 A1 * | 2/2007 | Pasek | ............... | B28B 19/0046 52/250 |
| 2008/0155919 A1 * | 7/2008 | Keshishian | ............... | E04C 2/044 52/309.11 |
| 2008/0184663 A1 * | 8/2008 | Martirossyan | ........ | B29C 44/326 52/745.19 |
| 2009/0113829 A1 * | 5/2009 | Meier | ............... | E04C 2/044 52/405.3 |
| 2010/0281784 A1 * | 11/2010 | Leo | ............... | E04B 1/30 52/16 |
| 2011/0197529 A1 * | 8/2011 | Calisse | ............... | E04C 2/044 52/309.1 |
| 2015/0191909 A1 * | 7/2015 | Linares, III | ............... | E04C 2/46 52/309.11 |
| 2020/0063428 A1 * | 2/2020 | Imhoff | ............... | E04C 5/06 |

FOREIGN PATENT DOCUMENTS

| | | |
|---|---|---|
| DE | 19743413 A1 | 12/1999 |
| EP | 0808959 A2 | 11/1997 |
| EP | 1022316 A1 | 7/2000 |
| EP | 2050548 A2 | 4/2009 |

OTHER PUBLICATIONS

EP 2050548 Machine Translation (Year: 2020).*
International Search Report dated Sep. 7, 2018 in parent PCT application PCT/EP2018/054732.
Written Opinion of the International Searching Authority dated Sep. 7, 2018 in parent PCT application PCT/EP2018/054732.
Examination report dated Nov. 12, 2019 in related European application 18713133.9.
Office Action dated Sep. 14, 2020 in related Chilean application 201902444.
Office Action dated Mar. 30, 2021 in related Eurasian application 201991648.

* cited by examiner

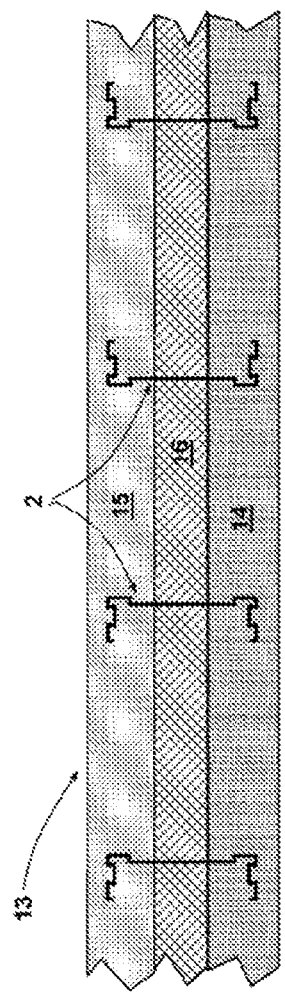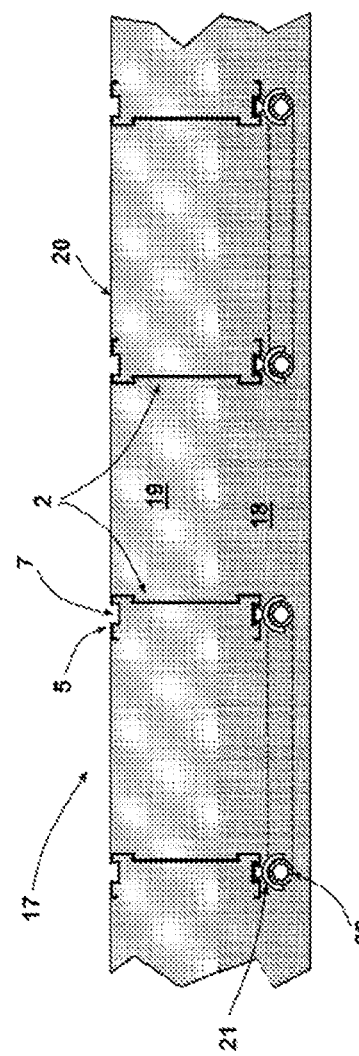

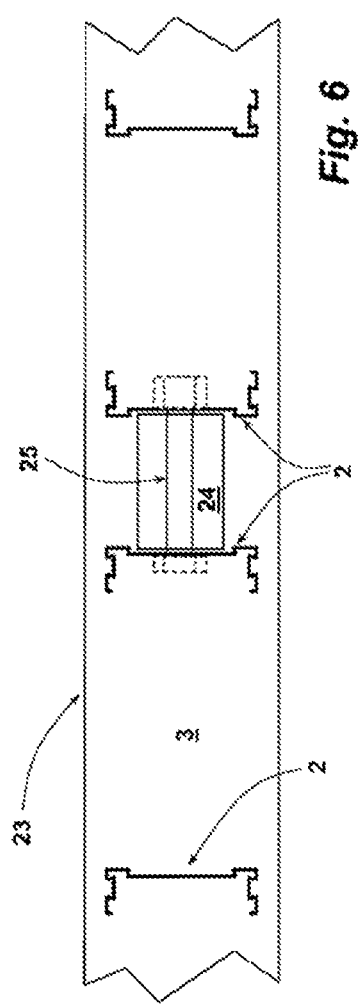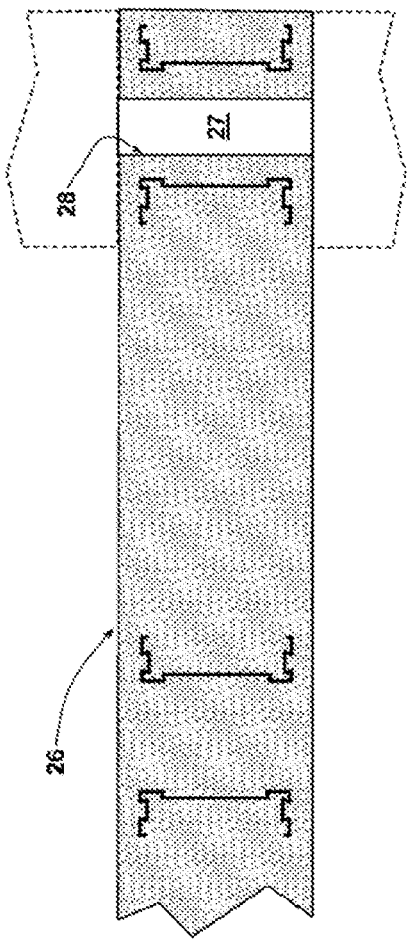

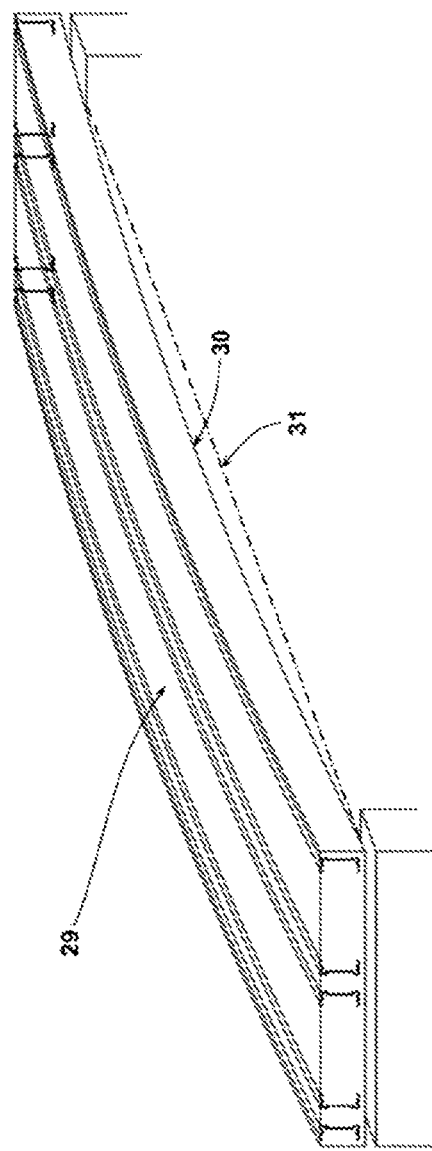

AERATED CONCRETE-HYBRID CONSTRUCTION ELEMENT

BACKGROUND

The present disclosure relates to an aerated concrete-hybrid construction element.

For the construction of buildings, panel wall and/or ceiling elements are used as pre-fabricated parts. Several such prefabricated construction elements designed as wall or ceiling construction elements are correspondingly matched together and connected to each other locally at the construction site for erecting the building. These construction elements have on their connecting sides complementary profiles that can be designed in the manner of a tongue and groove connection. With such prefabricated construction elements, buildings can be built in a short time. Due to the possibility of mass producing such construction elements, they can be produced inexpensively.

Such a wall or ceiling construction element is known from EP 0 808 959 B1. The construction element known from this prior art has two cover layers spaced apart from one another. The cover layers, which can also be considered as shells, are spaced by a plurality of spaced apart support structure profiles. The support structure profiles have a rib which runs transverse to the plane of the construction element. Through this, the distance of the cover layers from one another is defined. Support structure limbs are formed at the ends of the rib which are angled in the same direction. They extend parallel to the planar extension of the cover layers. Two support structure profiles each form a support space, the backs of the profiles facing each other and spaced from each other. Pre-stressable rebars are placed into this space. The support space is then filled with normal concrete. These support spaces filled with normal concrete form pillars through which the wall-side static loads are transferred to the lower abutment. Each construction element has a plurality of such pillars spaced apart.

The cavity existing between the pillars formed in this way is filled with an aerated lightweight concrete. In this construction element, the cover layers also serve to form a formwork, so that the core layers consisting of aerated lightweight concrete can be cast. In addition, the cover layers can take on insulating functions. The static properties of this construction element are defined by the pillar-like supports.

These previously known construction elements are produced by first attaching the support structure profiles to the inside of a cover layer. In a subsequent step, the opposing support structure limbs are connected to the other cover layer. Then the formwork is prepared for the subsequent concrete casting. Subsequently, after the rebar has been introduced into the support spaces, the normal concrete is poured into it. In a subsequent step, the lightweight concrete is poured to form the core layers.

Although these prior art construction elements used as wall or ceiling construction elements can be used advantageously, it would be desirable to have a construction element of this type available which is not only easier to manufacture, but also improved in terms of its functionality and thus improved in its applicability. Therefore, one aspect of the present disclosure is to propose such a construction element.

SUMMARY

This is achieved according to the present disclosure by an aerated concrete-hybrid construction element with a plurality of parallel and spaced-apart support structure profiles integrated therein, which support structure profiles comprise a rib running transversely to the plane of the construction element, with a respective support structure limb running from the plane of the rib and angled in the same direction and parallel or approximately parallel to the adjacent outer surface of the construction element, wherein the support structure limbs of the support structure profile are cast in an aerated concrete layer extending over the length of the support structure limbs in their juxtaposed arrangement.

By the term "aerated concrete" used in the context of these explanations, what is meant is such concrete that has a lower density compared to normal concrete due to its pores. The pores can be introduced into such an aerated concrete by using a blowing agent, so that this aerated concrete is a foamed concrete. The use of an aerated or aggregate concrete is also quite possible. Both embodiments are lightweight concrete with a density of typically less than 1,600 kg/m$^3$.

In this construction element, the support structure limbs are cast in an aerated concrete layer. Such an aerated concrete is a lightweight concrete. The support structure profiles are interconnected by the aerated concrete layer. Thus, several spaced-apart support structure profiles are located in one and the same aerated concrete layer. In this construction element, it is typically provided that at least the support structure limbs arranged on one side of the rib of the support structure profiles are cast in the continuous aerated concrete layer in their entirety, while the outwardly-facing surface of the other support structure limbs can be exposed and thus only partially cast into the aerated concrete layer. In other applications, the construction element will be designed so that both support structure limbs of the structure support structure profiles involved in the design of the construction element are completely cast in an aerated concrete layer. The casting of the support structure limbs into an aerated concrete layer facilitates production since, compared to the construction element disclosed in EP 0 808 959 B1, no additional cover layers are required for the production. It is also advantageous that due to the casting of the support structure limbs into an aerated concrete layer, the bonding effect between the support structure profiles and the aerated concrete layer is significantly improved by the surface connection of the as yet uncured aerated concrete to the cast support structure profile parts. This bond can be further improved by joining grooves or other means for joining the support structure profiles with the aerated concrete layer. By casting at least the support structure limbs of the support structure profile into the aerated concrete layer together with a portion of the adjacent rib, in this construction element both the support structure profiles and the concrete layer are defined statically in their interaction with each other. That is to say, both elements—support structure profiles and concrete layer—are responsible for the static equilibrium of the construction element and for the loads to be absorbed or transferred by the construction element. Therefore, due to this functionality, such a construction element can also be referred to as a hybrid construction element.

Due to its hybrid character with regard to the static definition, it is an advantage that, in order for such a construction element to meet static requirements, normal concrete which is required for the discussed prior art construction elements to achieve the required static properties, at least in the form of supports, is not required for its production. The construction element can thus be produced with a lower overall weight. To meet the static requirements as a wall or ceiling construction element, it is considered sufficient if the construction element has an average density of its aerated concrete layer of 400 to 1200 kg/m$^3$. Normal concrete, however, has a bulk density of about 2500 kg/m$^3$.

The advantages in the production of such a construction element are also due to the fact that the support structure profiles are cast into the aerated concrete layer. The attachment step or steps for connecting the support structure profiles to the cover layers according to EP 0 808 959 B1 are therefore omitted.

The casting of the support structure limbs into an aerated concrete layer opens up the possibilities that the aerated concrete layer can be constructed from a single or even a plurality of aerated concrete shells, for example two. In the latter case, each support structure limb is cast in its own aerated concrete shell. In a construction element in which the support structure limbs of the support structure profiles are cast in each case in an aerated concrete shell, the two aerated concrete shells may have different bulk densities. For example, it is possible to provide an aerated concrete shell with a higher bulk density, while the other aerated concrete shell has a lower bulk density. In such an embodiment of the construction element, the primary function of the aerated concrete shell with lower bulk density would be for insulation purposes, especially with respect to thermal insulation, while the aerated concrete shell with higher density accounts for a larger proportion of the static load-handling functionality. In the case of a construction element with two aerated concrete shells, these can be cast flush against one another. Due to the different bulk density, the aerated concrete shell with the lighter bulk density can be applied freshly onto the shell with the higher bulk density and immediately after it has been cast and not yet set. Then, the two cast aerated concrete shells bind simultaneously, with the result that they bind together in their border area and thereby the bond between the two aerated concrete shells is particularly pronounced and there is no recognizable interface in the transition from one aerated concrete shell to the other in the set construction element, but only a change in density. In such a construction element with two aerated concrete shells, if desired they can also be spaced apart, for example if an insulating layer is to be disposed between the two aerated concrete shells. Typically, in such a case, an insulating layer will be used which is sufficiently strong to prevent squeezing this material, at least not appreciably, when walked upon to allow one of the two aerated concrete shells to be poured thereon.

To increase the joining of the support structure limbs in the respective aerated concrete shell, one or more joining grooves can be provided which are recessed in the direction of the other support structure limbs and which follow the longitudinal length of the support structure profile. According to one embodiment, these grooves are undercut on both sides, for example in the manner of a dovetail. By means of such bosses or impressions on the one hand, the dimensional stability of the support structure limbs is increased. On the other hand, these joining grooves, which are open to the outside, can also be used to insert holders therein, for example holders for pipes, for example of a heating system. The holder and the objects connected thereto, such as the pipes, are then cast together with this support structure limbs in the concrete shell. Also, the rib can be reinforced by such bosses or imprints, increasing its rigidity. In one embodiment, it is provided that the rib is reinforced by a joining groove which follows the longitudinal length thereof, the groove being designed starting from the back of the rib in the direction of the bend in the support structure limbs. Such a joining groove can be undercut on both sides. In one advantageous embodiment, the width of the joining groove of the rib extends far enough for the edge border of the groove to reach into an aerated concrete shell and thus also be cast with it. This has a positive effect on the joining groove between the support structure profile and the aerated concrete shell or shells. In addition, the rib and/or the support structure limbs may have joining structures acting transversely to the longitudinal extension of the support structure profile.

Within the construction element, the support structure profiles are arranged at a distance from each other. The support structure profiles can be disposed in the same direction to each other, that is: The support structure limbs all point in the same direction. It is also possible to alternately arrange the support structure profiles with respect to the direction of the bend of the support structure limb. The support structure profiles can also be arranged in such a way to each other—for the purposes of handling such a construction element—that two support structure profiles are connected by a bolt with the backs of the structures facing each other. The two support structure profiles are arranged at a smaller distance from each other than to the other adjacent support structure profiles. This bolt is disposed in an end portion of the construction element close to the edge, and accessible from the outside. Around the bolt, a loop can be placed for lifting the construction element. Typically, such a construction element has one or two such lifting attachment points. Also, regardless of whether connection points are provided in this way, the support structure profiles can be arranged in the manner described above grouped in pairs in the construction element.

Such a construction element can be used as a wall construction element or as a ceiling construction element. Depending on the intended design of the construction element, the typically multiple aerated concrete shells may be formed in terms of their bulk density. In a design as a ceiling construction element, because of its being factory produced, the ceiling construction element can have a uniform curvature in the direction of the longitudinal extent of the support structure profiles, in fact in the opposite direction of the later load direction. This can be achieved by a corresponding design of the formwork table, for example by using a curved steel plate extending along the length of the construction element to be created. This is to be achieved in this way such that when installing such a ceiling construction element in the building to be created, the element tends to sag by its own weight, as is the case with prefabricated ceilings, but is brought into a flat shape due to the pre-curvature. In this respect, what is avoided by this measure is a bending of ceiling elements which would otherwise be observed, with the result being a non-flat ceiling top.

Due to the special properties of this aerated concrete hybrid construction element, this can be designed not only as a wall or as a ceiling construction element. Rather, it is also possible to create other building structure construction elements, such as stairs. According to one embodiment, the support structure profiles which are located within such a stair construction element are arranged in pairs with the backs of the profiles facing each other. The support structure profile pairs are suitable for connecting stair step support structure profiles, one end of which protrudes relative to the support structure limbs and at this end bear the load of a typically angled stair step edge protection profile. This represents an effective protection of the edge of the stairs.

This can be cast in the aerated concrete layer, with a small open distance to the aerated concrete surface or open on the surface.

BRIEF DESCRIPTION OF THE DRAWINGS

The present disclosure is described below by means of exemplary embodiments with reference to the accompanying figures. Shown are:

FIG. 6: a schematic plan view of the upper horizontal narrow side of a further construction element, FIG. 7 a schematic vertical section through a further construction element, FIG. 8: a perspective view of a section of yet another construction element which is designed as a ceiling construction element.

DETAILED DESCRIPTION

Figure 1:
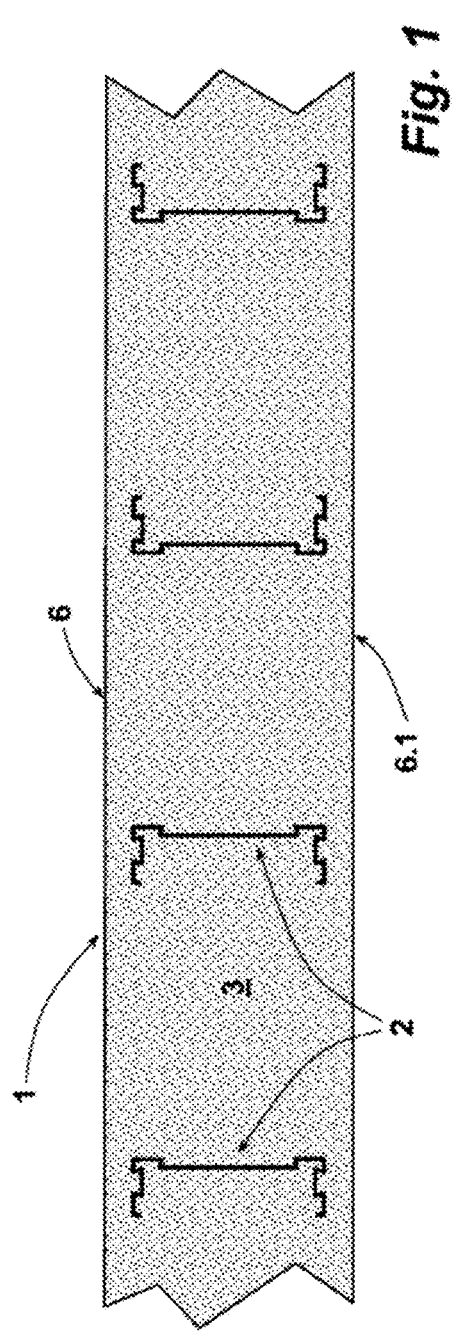
FIG. 1 a schematic horizontal section through a construction element according to a first embodiment, FIG. 2 an end view of a support structure profile which is used in the construction element of FIG. 1, FIG. 3 a schematic horizontal section through a construction element according to a further embodiment, FIG. 4 a schematic horizontal section through a construction element according to yet a further embodiment, FIG. 5 a schematic cross section through a construction element according to yet a further embodiment.
Figure 2:
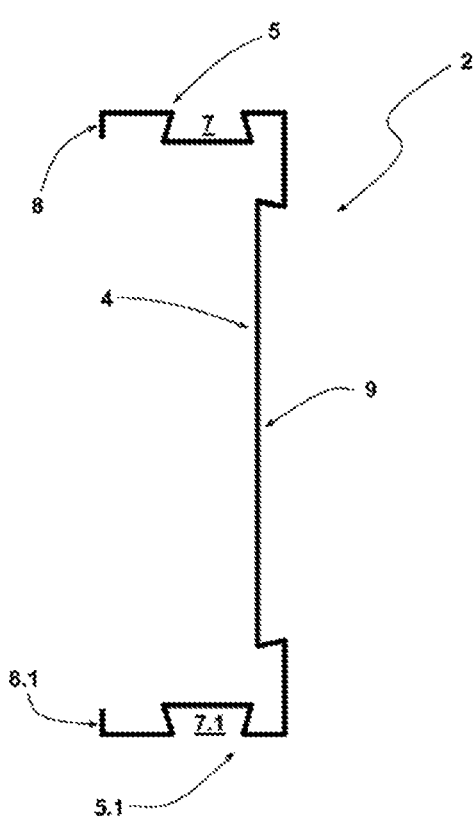

In the illustrated embodiment of FIG. 1, a construction element 1 provided as a wall element is constructed of a plurality of spaced-apart support structure profiles 2 made of steel. These have a wall thickness of at least 1 mm. In the illustrated embodiment, the support structure profiles are spaced apart by a distance of not more than 600 mm. The support structure profiles 2 are cast in an aerated lightweight concrete shell 3 with a density of 450 kg/m$^3$. The support structure profiles 2 extend through the entire length of the construction element 1, which length is equal to the height of the wall construction element since the construction element 1 is a wall construction element. The support structure profiles 2, of which a supporting structure 2 is shown enlarged in FIG. 2 in an end view, have a rib 4 from which a support structure limb 5, 5.1 is bent at each end. The support structure limbs 5, 5.1 are bent in the same direction. The support structure limbs 5, 5.1 run parallel or quasi-parallel to the outside 6, 6.1 of construction element 1. The support structure limbs 5, 5.1 deflected at an angle of 90° are structured by joining elements. This is a dovetail-shaped joining groove 7, 7.1 made in each support structure limb 5, 5.1 pointing in the direction of the other support structure limb 5.1, 5.2 extending over the entire longitudinal extent of the support structure profile 2 and an end-side bend 8, 8.1 which points to the other respective support structure limbs 5, 5.1. In the rib 4 there is also a joining groove 9 made in the cross-sectional shape of a dovetail. Due to these joining structures 7, 8, 7.1, 8.1, 9, in this exemplary embodiment the support structure profiles 2 are cast in their entirety in the aerated lightweight concrete shell 3. Because of this bond, the construction element 1 is statically defined in common with the support structure profiles 2 and the aerated lightweight concrete shell 3. Both elements—support structure profiles 2 and aerated lightweight concrete shell 3—assume static functions.

Figure 3:
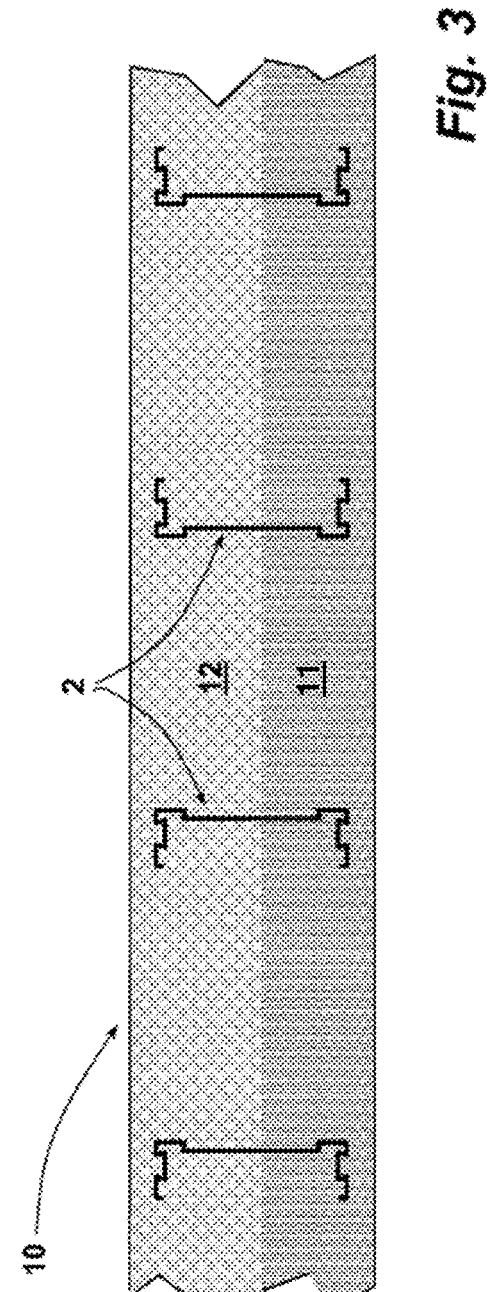

FIG. 3 shows a further construction element 10 in which the aerated lightweight concrete layer, which in the exemplary embodiment of FIG. 1 is formed from the aerated lightweight concrete shell 3, is formed from two aerated lightweight concrete shells 11, 12. In each aerated lightweight concrete shell 11, 12, a support structure limb 5, 5.1 of the support structure profiles 2 is cast. The bulk density of the aerated lightweight concrete shells 11, 12 is different, wherein in the illustrated exemplary embodiment, aerated lightweight concrete shell 11 has a higher bulk density than aerated lightweight concrete shell 12. The construction element 10 is provided as a wall construction element. Thus, the static equilibrium of the construction element 10 is defined by the support structure profiles 2 of primarily aerated concrete shell 11, while aerated lightweight concrete shell 12 assumes more of a thermal insulation function. However, this is involved in the static definition of the construction element 10, but to a lesser extent. In this exemplary embodiment, the bulk density of aerated lightweight concrete shell 11 is about 600 kg/m$^3$ and that of aerated lightweight concrete shell 12 is 350 kg/m$^3$.

To produce the construction element 10, after the support structure profiles 2 are brought into the desired arrangement to each other, first aerated lightweight concrete shell 11, with its higher bulk density, is poured into a corresponding form. Aerated lightweight concrete shell 12 can be cast onto aerate lightweight concrete shell 11 wet on wet. Due to the lower bulk density thereof, it will not mix with the as yet uncured material of aerated lightweight concrete shell 11 or penetrate into it. By the simultaneous setting of the two aerated lightweight concrete shells 11, 12, the connection of the two shells 11, 12 is particularly good.

FIG. 4 shows a further construction element 13 which, just like construction element 10, has two aerated lightweight concrete shells 14, 15. In contrast to construction element 10, the two aerated lightweight concrete shells 14, 15 are spaced from each other in construction element 13. An insulating material layer 16 is inserted between the two aerated lightweight concrete shells 14, 15 in this embodiment. The bulk densities of aerated lightweight concrete shells 14, 15 correspond to those of aerated lightweight concrete shells 11, 12, wherein aerated lightweight concrete shell 15 is the one with the lower bulk density. The insulating material layer 16 is strong enough to be walked upon and thus sufficiently firm enough to apply the insulating material layer 16 wet on wet after casting aerated lightweight concrete shell 14 and then immediately casting aerated lightweight concrete shell 15. The casting of aerated lightweight concrete shells 14, 15 can thus take place in one step just as in the embodiment of FIG. 3 and without the necessary waiting time for the first cast aerated lightweight concrete shell 14 to harden. As can be seen from FIG. 3, in this exemplary embodiment as well, the support structure limbs 5, 5.1 are completely cast in each case in an aerated lightweight concrete shell 14 or 15.

Yet another embodiment of a construction element 17 is shown in FIG. 5. This construction element 17 also has two aerated lightweight concrete shells 18, 19. The construction element 17 is provided as a ceiling construction element. Aerated lightweight concrete shell 18 has a higher bulk density than aerated lightweight concrete shell 19 in the illustrated embodiment, in this case a bulk density of about 850 kg/m$^3$. Aerated lightweight concrete shell 19 has a bulk density of about 500-650 kg/m$^3$. The top 20 of construction element 17 forms the substrate for a floor to be applied thereon, for example a screed. For this reason, the support structure limbs 5 of the support structure profiles 2 used in the design of this construction element 17 are exposed at the tops. Due to the joining grooves 7 which are then also exposed, a special joining option is created here for a screed to be applied on the top 20 (not shown).

Holders 21 are placed in individual joining grooves 7.1 of the other support structure limbs 5.1 of the support structure profiles 2 or of each of the same of the ceiling construction element 17, the holders holding pipes 22 for a piping system for heating. As can be seen from the sectional view of FIG. 5, the holders 21 with the tubes 22 held thereby are cast in aerated lightweight concrete shell 18. As the exemplary embodiment of construction element 17 shows, in the described concept the joining grooves 7, 7.1 present in the support structure limbs 5, 5.1 serve not only a stiffening, but also additional purposes, which are support purposes in this embodiment. In this ceiling construction element 17, aerated lightweight concrete shell 18 is the lower shell, which serves as a heat radiator in an operation of a heat transfer fluid guided through the tubes 22. In this embodiment, the bulk density is thus also used so that this shell can get a heat radiator function. In an analogous manner, the pipes 22 of the pipeline system integrated in aerated lightweight concrete shell 18 can also be used for ceiling cooling. It is understood that the above-described concept of the integration of pipes or a piping system is also possible in both aerated lightweight concrete shells, as well as the integration of such a piping system cast in an aerated lightweight concrete shell in connection with the realization of a wall heating system.

In a manner not shown, construction element 17 is slightly curved in the direction of the longitudinal extent of the support structure profiles (in the clamping direction of the ceiling construction element 17), specifically by an amount which corresponds to the length of construction element 17 divided by a factor of 200: L/200 [length unit]. By this curvature, the top 20 of the construction element 17 is slightly convex. As a result, the construction element 17, which is designed as a ceiling construction element, is pre-curved to such a degree that a sagging of the same which occurs during installation leads to the top 20 then becoming flat. A perspective view of another such construction element is described in FIG. 8.

FIG. 6 shows a further construction element 23. This construction element 23 which is designed as a ceiling construction element is in principle designed similar to construction element 1 of FIG. 1. Therefore, like parts are identified with the same reference signs. Construction element 23 differs from construction element 1 in that two support structure profiles 2 are arranged at a closer distance from one another and a release 24 is provided between them near the middle of their rib. The two support structure profiles 2 with their backs facing each other are connected together by a bolt 25, wherein the bolt 25 extends through the release 24. The exposed shaft of the bolt 25 can serve as a connection point for connecting a hoist, such as a loop to lift the construction element 23 with a crane or the like. FIG. 6 shows an example of such a hoist connection point. When construction element 23 only has a single such hoist attachment point, it is located centrally with respect to its length. In many cases, two such hoist connection points will be provided correspondingly spaced apart.

FIG. 7 shows a further construction element 26. Construction element 26 is designed as a ceiling construction element and designed in principle in this embodiment similar to construction element 1 of FIG. 1. Construction element 26 differs due to the arrangement of its support structure profiles 2 which, as can be seen from this figure, are arranged with their backs facing each other in pairs. Construction element 26 is designed to be bolted to the adjacent walls (shown dashed in this figure). The walls then have a grip for accessing the bolt head and a turnbuckle. In this embodiment, the mutually facing sides of construction element 26 and the narrow sides of the adjacent walls are protected by a frame profile by means of which a positive lock connection can be made in the transverse direction relative to the height of the walls. For this reason, an opening 27 is provided between the two support structure profiles 2, which are arranged in the figure on the right edge of construction element 26. The opening 27 is provided by a corrugated pipe section within the formwork for casting construction element 26. The corrugated tube insert 28 is part of construction element 26. Through this vertical opening 27 through construction element 26, it is possible to screw the ceiling construction element 26 to its base and/or its upper mount, for example, a wall. Such a construction element connection is primarily useful in buildings that are built in earthquake-prone areas.

FIG. 8 shows a further construction element 29, which is designed as a ceiling construction element. In this figure, only a portion of the construction element 29 is shown. This construction element 29 is shown schematically laid out on a substrate and is convexly curved over its span, wherein FIG. 8 shows the construction element 29 before it is completely decoupled from a crane 29 carrying the construction element. The distance of the lower apex 30 from an imaginary line 31 connecting its ends corresponds to the value L/200, wherein L is the length of the construction element 29 in the direction of its span.

Figure 9:
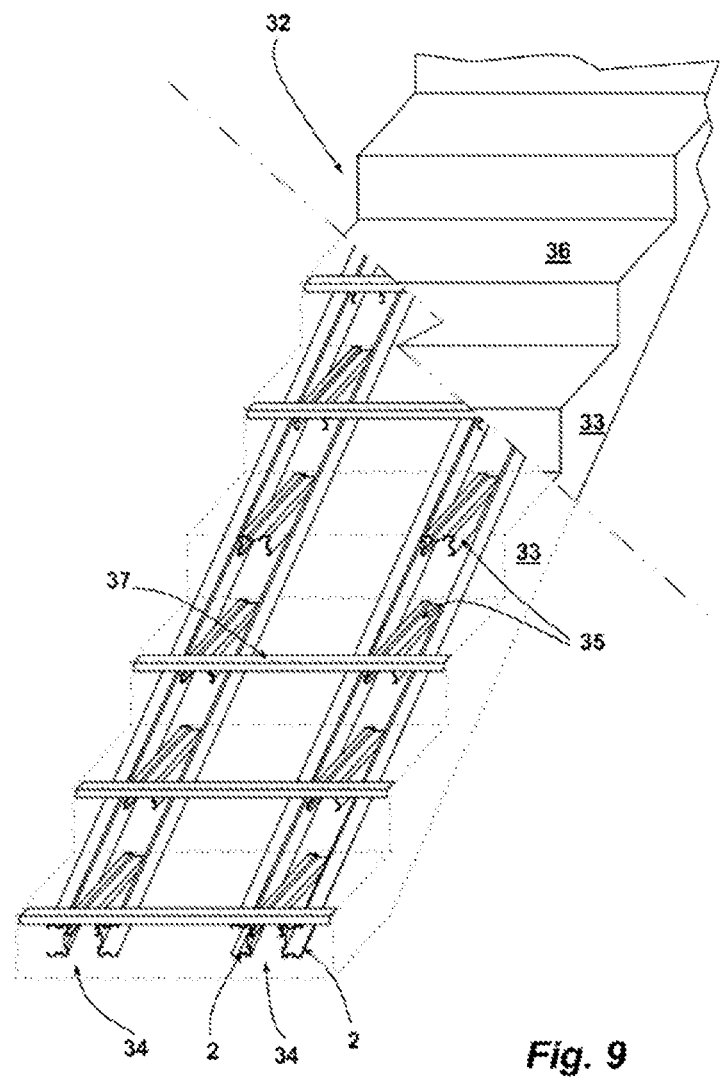
FIG. 9: a perspective view/view into yet another construction element, designed as a stair construction element.

Due to the hybrid character of the above-described aerated concrete construction elements with respect to the functionality defining the statics thereof, the above-described concept of a construction element design is also suitable for the formation of other construction element embodiments, such as stair construction elements. Such a stair construction element 32 is shown in FIG. 9. FIG. 9 shows the construction element 32 in a partial view (upper section) and in a partial view (lower section). The construction element 32 is constructed in accordance with the concept of the integration of support structure profiles 2 into an aerated lightweight concrete layer 33 already explained in connection with the above-described construction elements. In the illustrated stair construction element 32, two support structure profile pairs 34 are arranged at a distance from each other. Each support structure profile pair 34 is spaced from the adjacent lateral end of construction element 32. The two support structure profiles 2 of a support structure profile pair are arranged with their backs facing each other and at a distance from each other. Between these, stair step support structure profiles 35 are arranged, namely at an angle to the longitudinal extent of the support structure profiles 2. These serve to support the stair steps 36 to be designed and to support a stair step edge protection profile 37 that is located at the free ends of the stair step support structure profiles 35. The stair step edge protection profiles 37 have a width that corresponds approximately to the width of the stair construction element 32. The support structure profile pairs 34 with the stair step support structure profiles 35 held thereby and stair step support structure profile 37 are placed in a suitably prepared formwork before the still flowable aerated lightweight concrete is introduced into a formwork containing the above-described construction elements. After setting of the aerated lightweight concrete, the stair construction element 32 is completed.

In this construction element 32 the force introduced via the stairs 36 to the construction element 32 is introduced via stair step support structure profile 35 to support structure profile 2 and to aerated lightweight concrete 33 and from this to the substrate supporting stair construction element 32. In this embodiment, the hybrid character of construction element 32 again becomes particularly clear.

The present disclosure has been described with reference to exemplary embodiments. Without departing from the scope of the applicable claims, numerous other possibilities arise for a person skilled in the art to implement the present disclosure within the scope of the valid claims without these having to be explained in the context of these embodiments.

| List of reference symbols | |
|---|---|
| 1 | Construction element |
| 2 | Support structure profile |
| 3 | Aerated lightweight concrete shell |
| 4 | Rib |
| 5, 5.1 | Support structure limb |
| 6, 6.1 | Outside |
| 7, 7.1 | Joining groove |
| 8, 8.1 | Edge |
| 9 | Joining groove |
| 10 | Construction element |
| 11 | Aerated lightweight concrete shell |
| 12 | Aerated lightweight concrete shell |
| 13 | Construction element |
| 14 | Aerated lightweight concrete shell |
| 15 | Aerated lightweight concrete shell |
| 16 | Insulation layer |
| 17 | Construction element |
| 18 | Aerated lightweight concrete shell |
| 19 | Aerated lightweight concrete shell |
| 20 | Top |
| 21 | Holder |
| 22 | Pipe |
| 23 | Construction element |
| 24 | Release |
| 25 | Bolt |
| 26 | Construction element |
| 27 | Perforation |
| 28 | Corrugated tube insert |
| 29 | Construction element |
| 30 | Apex |
| 31 | Line |
| 32 | Stair construction element |
| 33 | Aerated lightweight concrete layer |
| 34 | Support structure profile pair |
| 35 | Stair step support structure profile |
| 36 | Stair step |
| 37 | Stair step edge protection profile |

The invention claimed is:

1. An aerated concrete hybrid construction element with outer surfaces which extend along either side of a plane of the construction element, comprising:
multiple support structure profiles that are parallel and mutually spaced apart from one another, each of the support structure profiles comprising a rib arranged transversely to the plane of the construction element, each rib having two support structure limbs which extend away from the rib in a direction parallel to the plane of the construction element, wherein the support structure profiles extend through an entire length of the construction element;
wherein the support structure limbs of the support structure profiles are embedded into an aerated concrete layer which extends over an extent of the support structure limbs along the plane of the construction element, the aerated concrete layer is formed from at least two aerated concrete shells, and a first support structure limb of each rib is enclosed in a first concrete shell of the at least two aerated concrete shells and a second support structure limb of each rib is enclosed in a second concrete shell of the at least two aerated concrete shells, and
wherein a bulk density of the first concrete shell is higher than that of the second concrete shell, and both the first and second concrete shells take over a portion of a static load assumption function of the construction element, wherein the first concrete shell with higher bulk density takes over a greater portion of the static load assumption function than the second concrete shell, and the second concrete shell with lower bulk density is assigned a primarily insulating function compared to the portion of the static load assumption function assigned to the second concrete shell.

2. The construction element of claim 1, wherein each support structure limb comprises at least one clamping groove introduced therein in a direction of the other support structure limb, the at least one clamping groove extending along a longitudinal extension of the support structure profile.

3. The construction element of claim 2, wherein the at least one clamping groove is undercut on opposing sides thereof.

4. The construction element of claim 2, wherein pipe holders are secured in the at least one clamping groove.

5. The construction element of claim 1, wherein each rib comprises at least one clamping groove extending along a longitudinal extension of the support structure profile.

6. The construction element of claim 5, wherein the at least one clamping groove of the rib is introduced into the rib in the direction in which the two support structure limbs extend away from the rib.

7. The construction element of claim 1, wherein the first and second concrete shells are arranged at a distance from one another.

8. The construction element of claim 1, wherein impact-resistant insulating material layer is arranged between the first and second concrete shells.

9. The construction element of claim 1, wherein the bulk density of the first concrete shell is 30-50% greater than that of the second concrete shell.

10. The construction element of claim 1, wherein the construction element comprises two support structure profiles of the multiple support structure profiles with the ribs thereof facing one another and the support structure limbs thereof extending in opposite directions, the two support structure profiles spaced a shorter distance apart from one another than from adjacent support structure profiles, and wherein, in at least one end region of the construction element, the ribs of the two support structure profiles are connected to one another by a bolt which extends through an open release space provided in the construction element between the ribs.

11. The construction element of claim 1, wherein the construction element is curved uniformly in a direction of a longitudinal extension of the support structure profiles.

12. The construction element of claim 11, wherein a distance of an apex of the curved construction element from an imaginary line connecting ends of the curved construction element corresponds to $L/200$, where $L$ is a length of the curved construction element in the direction of the longitudinal extension of the support structure profiles.

* * * * *